(12) United States Patent
Shverdin et al.

(10) Patent No.: US 11,716,036 B1
(45) Date of Patent: Aug. 1, 2023

(54) HAPTIC FEEDBACK DEVICES WITH REDUCED POWER CONSUMPTION

(71) Applicant: Amazon Technologies, Inc., Seattle, WA (US)

(72) Inventors: Miroslav Yakov Shverdin, Mountain View, CA (US); Szymon Michal Tankiewicz, San Jose, CA (US); Varn Khanna, Vallejo, CA (US)

(73) Assignee: Amazon Technologies, Inc, Seattle, WA (US)

( * ) Notice: Subject to any disclaimer, the term of this patent is extended or adjusted under 35 U.S.C. 154(b) by 1,027 days.

(21) Appl. No.: 16/356,308

(22) Filed: Mar. 18, 2019

(51) Int. Cl.
| | |
|---|---|
| G08B 6/00 | (2006.01) |
| H02N 2/06 | (2006.01) |
| H02N 2/04 | (2006.01) |
| G06F 1/32 | (2019.01) |
| G06F 1/16 | (2006.01) |
| G06F 1/18 | (2006.01) |

(52) U.S. Cl.
CPC ............... *H02N 2/067* (2013.01); *G06F 1/32* (2013.01); *G06F 1/163* (2013.01); *G06F 1/183* (2013.01); *G06F 1/189* (2013.01); *G06F 1/1698* (2013.01); *G08B 6/00* (2013.01); *H02N 2/043* (2013.01)

(58) Field of Classification Search
CPC ........ H02N 2/067; G06F 1/163; G06F 1/1698; G06F 1/183; G06F 1/189; G06F 1/32; G08B 6/00; H02N 2/043
See application file for complete search history.

(56) References Cited

U.S. PATENT DOCUMENTS

| | | | | |
|---|---|---|---|---|
| 5,896,096 | A * | 4/1999 | Kim | G08B 6/00 340/407.1 |
| 6,134,964 | A * | 10/2000 | Jaenker et al. | B06B 1/0261 73/514.36 |
| 9,104,271 | B1* | 8/2015 | Adams et al. | G06F 3/0233 |
| 10,268,273 | B1* | 4/2019 | Sundaram et al. | G06F 3/0346 |
| 10,529,198 | B1* | 1/2020 | Khoshkava | H02K 33/16 |
| 10,725,544 | B1* | 7/2020 | Taylor et al. | G06F 3/03545 |
| 2002/0171330 | A1* | 11/2002 | Kato et al. | B65G 27/26 310/328 |
| 2016/0063826 | A1* | 3/2016 | Morrell et al. | G08B 6/00 340/407.1 |
| 2016/0179198 | A1* | 6/2016 | Levesque et al. | G06F 1/163 340/407.1 |
| 2016/0179199 | A1* | 6/2016 | Levesque et al. | G06F 3/016 340/407.2 |
| 2016/0189492 | A1* | 6/2016 | Hamam et al. | G08B 6/00 340/407.1 |
| 2016/0334871 | A1* | 11/2016 | Levesque | G06F 1/1632 |
| 2018/0218645 | A1* | 8/2018 | Stump | G09B 23/28 |
| 2019/0299252 | A1* | 10/2019 | Sherrit et al. | A61B 17/22012 |
| 2019/0384399 | A1* | 12/2019 | Forest et al. | G06F 3/016 |

* cited by examiner

*Primary Examiner* — An T Nguyen
(74) *Attorney, Agent, or Firm* — Eversheds Sutherland (US) LLP

(57) ABSTRACT

Systems, methods, and computer-readable media are disclosed for haptic feedback devices with reduced power consumption. In one embodiment, an example device may include a first spring, a mass coupled to the first spring, and a resonant piezoelectric actuator coupled to the first spring. The resonant piezoelectric actuator may be configured to impart a force on the mass via the first spring responsive to an applied voltage. The device may include a power source configured to supply the applied voltage to the resonant piezoelectric actuator, where motion of the mass generates vibration.

17 Claims, 7 Drawing Sheets

HAPTIC FEEDBACK DEVICES WITH REDUCED POWER CONSUMPTION

BACKGROUND

Electronic devices may have microphones, speakers, and other components. Certain devices may be wearable devices, such as watches, glasses, and the like, and may be worn by users. Such devices may use vibrations to provide feedback to users. For example, vibrational feedback may be used to provide non-visual notifications to users. To generate vibrational feedback, devices may employ mechanisms such as motors. However, such mechanisms may be susceptible to breakage, may consume internal space within a device, and may be sources of high power consumption. Accordingly, haptic feedback devices with reduced power consumption may be desired.

DETAILED DESCRIPTION

Figure 1:
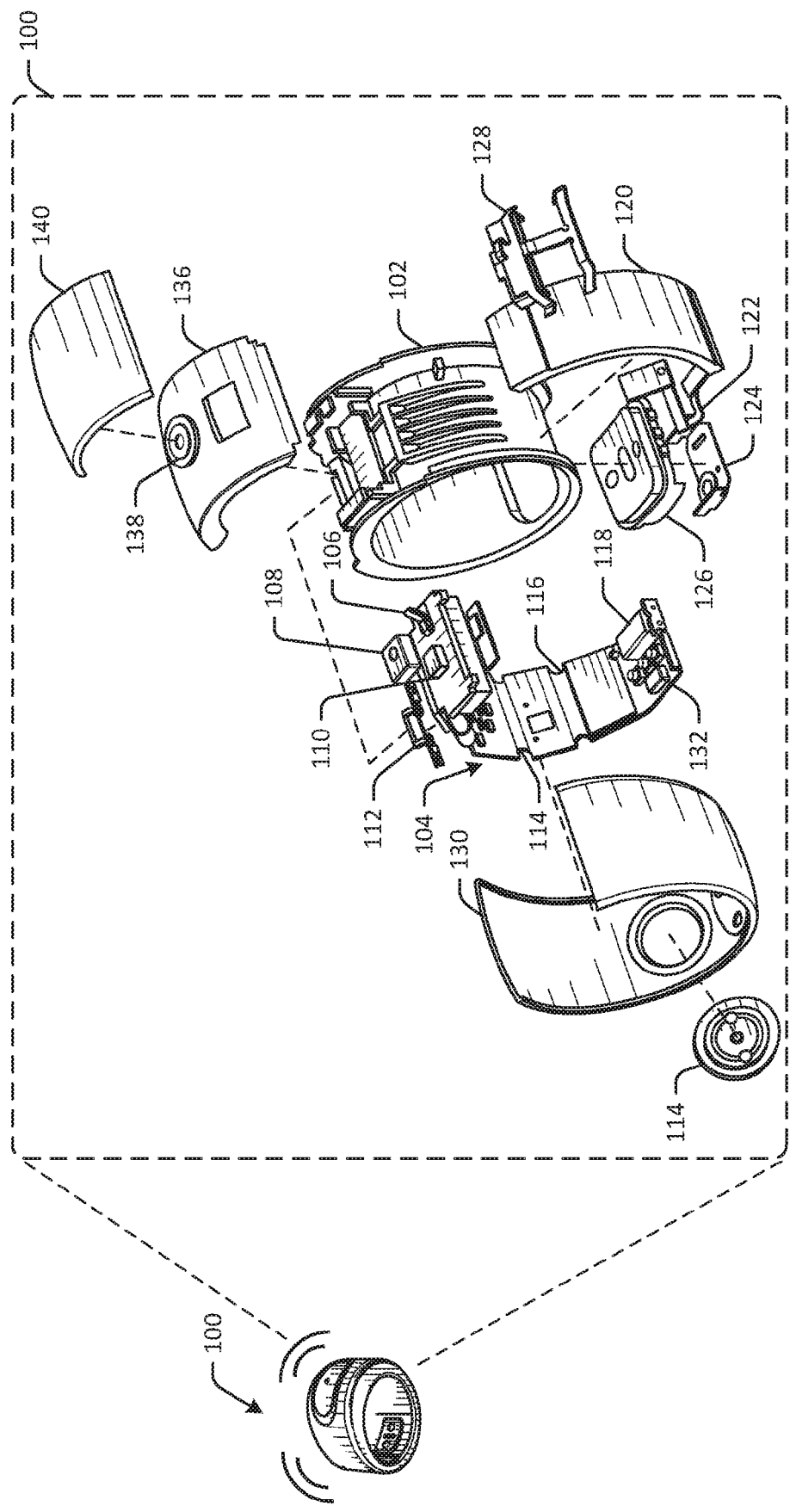
FIG. 1 is a schematic drawing of a ring-shaped device with a haptic feedback device in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may encompass, depending on the context, a plural number of such components or elements and vice versa.

Overview

Wearable devices may include electronic devices that a user can wear, for example, as an accessory, or can otherwise take with them, such as in the user's pocket. Wearable devices may include watches, bracelets, glasses, electronic trackers, and so forth. Because wearable devices may be worn by users, factors of the device including size, weight, shape, and the like may affect a user experience with the device. For example, a device that is bulky, heavy, or too large may be impractical for certain users to use or wear. In addition, reducing a size or footprint of a device may affect the functionality of the device. For example, reducing the size of a battery in the device may reduce an amount of time the device can operate without being recharged. Accordingly, a size, shape, weight, and/or other factors may impact not only a user experience with a wearable device, but functionality of the device as well.

However, such mechanisms may be susceptible to breakage, may consume internal space within a device, and may be sources of high power consumption. Accordingly, haptic feedback devices with reduced power consumption may be desired.

Embodiments of the disclosure may include haptic feedback devices that consume a reduced amount of power relative to typical haptic feedback devices, improve robustness and/or mechanical strength, and may maintain or reduce a footprint or amount of space consumed within a device. Different wearable devices may have different capabilities. For example, a wearable glasses device may be configured to provide augmented reality information on a display of the glasses, while a wearable watch device may be configured to detect heartrate, monitor physical activity, and so forth. Embodiments of the disclosure include haptic feedback devices that can be included in any suitable device, such as ring-shaped electronic devices that may be worn by users as a ring around the user's finger. The ring-shaped devices may be configured to detect voice input and may be configured to wirelessly communicate with other electronic devices. For example, in some instances, a user may be unable or unwilling to take a smartphone out of the user's pocket or bag. However, the user may wish to set a timer, send a message, or perform another task. Using the ring-shaped devices described herein, the user may speak a voice command to the ring-shaped device, and the ring-shaped device may send the voice command to the user's smartphone or other device. The user may therefore not have to physically interact with the smartphone. Other examples of functionality include using the ring-shaped devices to control other electronic devices, such as televisions, stereos, content streaming devices, and so forth, sending voice messages, receiving information (e.g., audible presentation of a current time, etc.), and other functionality.

Because the user may wear the ring-shaped device around a finger, a size of the ring-shaped device may be limited. In addition, wireless performance of the ring-shaped device, such as transmission range, may be affected by contact between the ring-shaped device and adjacent fingers. For example, the nearby fingers may absorb radio waves transmitted by the ring-shaped device. Accordingly, the haptic feedback devices described herein may reduce or maintain an amount of space consumed within the larger device.

This disclosure relates to, among other things, systems, methods, computer-readable media, techniques, and methodologies for haptic feedback devices with reduced power consumption. Embodiments may include haptic feedback devices that implement driving schemes the reduce power consumption, and improve mechanical strength, such as resistance to failure due to tensile or shear stress.

Some embodiments include a haptic design that combines high quality factor mechanical resonance with a piezoelectric ceramic drive to minimize power consumption, reduce device volume, and improve mechanical robustness. Certain embodiments include a linear piezoelectric stack, a spring, and a mass. The piezoelectric stack may be a resonant piezoelectric actuator that drives the mass and spring system with a sinusoidal varying force that may be applied on-resonance. The mechanical resonance may amplify the small (e.g., few-micrometer, etc.) displacement of the piezoelectric actuator, thereby producing g-scale acceleration. Haptic feedback devices described herein can be packaged in-line to minimize shear stress, and may include sidewalls to prevent large shear stress. Tensile stress may be mitigated by placing a mechanical barrier, such as a sidewall, to limit the maximum distance traveled by the mass on a spring.

In some embodiments, a method for optimizing power consumption of a resonant piezoelectric actuator may be implemented. Resonant actuators may include linear resonant actuators and resonant piezoelectric actuators, as described herein. In contrast to traditional drive schemes, where resonant actuators are driven with a driving frequency equal to the resonant frequency, and a length of time substantially equal to a desired acceleration time. For example, to attain a 100 millisecond haptic response, the driving pulse may typically be approximately 100 milliseconds long. The driving amplitude may be adjusted to attain desired acceleration on the object. In contrast, certain embodiments may reduce power consumption while maintaining similar haptic experience by implementing an intermittent driving pulse (where the pulse is sufficiently long to transfer energy to the spring and mass system to attain desired acceleration). After the desired acceleration is achieved, the pulse drive is turned off. After a desired delay, the driving pulse may be turned on again.

Referring to FIG. 1, a schematic drawing of a ring-shaped device 100 with a haptic feedback device is illustrated in exploded view in accordance with one or more embodiments of the disclosure. In the illustrated example, a user may use the ring-shaped device 100 to communicate with another electronic device, such as a smartphone. To interact with the ring-shaped device 100, the user may, in some instances, interact with a button or other component of the ring-shaped device 100 to initiate monitoring for voice input. In other instances, the user may interact with the ring-shaped device 100 by speaking a wake word, such as "Alexa," or by making a certain gesture, such as lifting the user's hand towards the user's mouth. The ring-shaped device 100 may listen for a request or voice command, and may respond accordingly. For example, the ring-shaped device 100 may cause one or more operations to be performed, such as controlling other devices (e.g., televisions, lights, radios, thermostats, etc.), may respond with audio or visual information (e.g., weather, news, messages, etc.), and/or may perform different actions in response to a request or command.

The ring-shaped device 100 may have a housing. The housing may be ring-shaped and/or substantially circular, and may be formed of one or more portions. For example, the housing may include an inner shell 102 and an outer shell 130. An antenna element 140 may form at least a portion of the housing, such as a top portion ("bottom," "top," "upper," "lower," and "side" as used herein describe relative positioning for illustrative examples and not absolute positioning).

The ring-shaped device 100 may include the inner shell 102. The inner shell 102 may be in contact with a user's finger when the ring-shaped device 100 is worn by a user. The inner shell 102 may be formed of metal, such as stainless steel, and in some instances, may be formed of metal injection molded panacea material. The inner shell 102 may be formed of metal to improve biocompatibility and/or the feel of the ring-shaped device 100 to a user.

The inner shell 102 may be coupled to the outer shell 130. The outer shell 130 may be formed of a metal material, such as titanium. In some embodiments, the outer shell 130 may be formed of a stamped titanium material. The inner shell 102 may be disposed within the outer shell 130 and may be coupled using an adhesive, such as glue. In some embodiments, the inner shell 102 may be a circular inner shell, in that the outer surface of the inner shell 102 that is in contact with a user's finger during use may be circular or substantially circular. The circular portion of the inner shell 102 may form an inner surface of the housing of the ring-shaped device.

The antenna element 140 may be disposed along the top of the ring-shaped device 100 and may be formed of metal, such as a stamped titanium material. The antenna element 140 may form a portion of the outer surface of the housing of the ring-shaped device 100. The antenna element 140 may be a curved antenna element, so as to maintain a curvature of an outer surface of the ring-shaped housing. The outer shell 130 may be coupled to the curved antenna element 140. In some embodiments, one or more holes or apertures may be formed in the antenna element 140, and a microphone may be aligned with the one or more holes or apertures. In some embodiments, the inner shell 102, the outer shell 104, the antenna element 140, and/or an optional plastic carrier component may be glued together for structural sealing.

One or more components may be disposed within the housing of the ring-shaped device 100. For example, a flexible printed circuit assembly 104 may be disposed inside the housing along a first side of the ring-shaped device 100. A number of components may be coupled to or mounted on the flexible printed circuit assembly 104. For example, an antenna feed component 106 may be disposed at a first segment of the flexible printed circuit assembly 104. The antenna feed component 106 may couple the flexible printed circuit assembly 104 (and/or one or more components of the flexible printed circuit assembly 104) to the antenna element 140. In some embodiments, the antenna feed component 106 may be configured to electrically couple the flexible printed circuit assembly 104 to the antenna element 140. A first microphone 108 may be disposed on the flexible printed circuit assembly 104 adjacent to the antenna feed component 106. The first microphone 108 may be disposed at or near an upper portion of the ring-shaped device 100, and may therefore be used for noise cancellation, as a user may not wish to speak into the upper portion of the ring-shaped device 100 (e.g., the user may find doing so awkward, etc.). The first microphone 108 may be configured to cancel ambient noise. A haptic feedback device 110 may be disposed on the first segment of the flexible printed circuit assembly 104 adjacent to the antenna feed component 106. The haptic feedback device 110 may be a resonant haptic device and may include a piezoelectric actuator in some instances. The haptic feedback device 110 may be configured to provide haptic or vibrational feedback to a user. A grounding spring 112 may be coupled to the flexible printed circuit assembly 104 and the inner shell 102 and/or outer shell 130 to provide grounding. In some embodiments, the grounding spring 112 may be coupled to a first flexible portion 114 of the flexible printed circuit assembly 104 between respective segments of the flexible printed circuit assembly 104. For example, the first flexible portion 114 may be positioned between a second segment and a third segment of the flexible printed circuit assembly 104, and a second flexible portion 116 may be positioned between the third segment and a fourth segment of the flexible printed circuit assembly 104. The grounding spring 112 may be used in conjunction with optional conductive foams disposed about the bend regions or flexible portions of the flexible printed circuit assembly 104. The bend regions or flexible portions may include exposed coverlay sections that provide access to cross-hatched copper ground, and the grounding spring 112 and/or conductive foams may couple the cross-hatched copper ground to the outer shell 130 and/or inner shell 102.

The antenna feed component 106, first microphone 108, and haptic feedback device 110 may be disposed on a first side of the flexible printed circuit assembly 104. The first side may be outward facing, or may face the outer shell 130 of the ring-shaped device 100. Additional components may be disposed on a second side of the flexible printed circuit assembly 104. The second side may be opposite the first side and may be, in some instances, inward facing, or may face the inner shell 102.

For example, a speaker assembly 118 may be disposed on the second side of the flexible printed circuit assembly 104. The speaker assembly 118 may be disposed on a segment of the flexible printed circuit assembly 104 that is at an opposite end of the flexible printed circuit assembly 104 with respect to the antenna feed component 106, in some embodiments.

The ring-shaped device 100 may include one or more microphones configured to detect sound and/or generate an audio signal. The microphones may be positioned within the housing and may correspond to the locations of one or more microphone holes on the housing. A second microphone 132 may be disposed adjacent to the speaker assembly 118. The second microphone 132 may be configured to detect voice input.

The flexible printed circuit assembly 104 may be coupled to a power source, such as a battery 120. The battery 120 may be a curved battery and may be configured to power the ring-shaped device 100. The battery 120 may be any suitable battery type, such as lithium ion, nickel cadmium, etc. the battery 120 may be rechargeable. The battery 120 may be disposed in the housing of the ring-shaped device 100 along a second side of the ring-shaped device 100, or along a side of the housing opposite the flexible printed circuit assembly 104. The battery 120 may be coupled to the flexible printed circuit assembly 104 using, for example, a flexible jumper component 122. The flexible jumper component 122 may be used to form an electrical connection between the battery 120 and the flexible printed circuit assembly 104, and may remove the need for soldering in some instances. The flexible jumper component 122 may be configured to electrically couple the flexible printed circuit assembly 104 and the curved battery 120, where the flexible jumper component 122 may be disposed between a first end of the flexible printed circuit assembly 104 and a second end of the curved battery 120.

A strap 126 may be included to couple the battery 120 to a charging contact assembly 126. The charging contact assembly 126 may include one or more charging contacts that can be used to electrically couple the ring-shaped device 100 to a charger in order to charge the battery 120. In some embodiments, the charging contacts may be inward facing (e.g., with respect to a center of the ring, etc.), while in other embodiments, the charging contacts may be outward facing (e.g., with respect to the outer shell 130, away from the ring, etc.). The charging contact assembly 126 may be coupled to the inner shell 102 and/or the outer shell 130. In some embodiments, the charging contact may be coupled to the inner shell 102 via the charging contact assembly 126, and the charging contact may be oriented in an inward facing orientation, or towards a center of the ring-shaped device 100. A grounding bridge 128 may be coupled to the battery 120 to provide grounding. The grounding bridge 128 may be coupled to the inner shell 102 and/or the outer shell 130.

A plastic carrier component 136, which may be a plastic bracket, may support the antenna element 140. The plastic carrier component 136 may include a curved body portion and one or more raised portions. The plastic carrier component 136 may at least partially separate the antenna element 140 from the outer shell 130 and/or the inner shell 102. For example, the plastic carrier component 136 may be disposed in the housing of the ring-shaped device 100 between the antenna element 140 and the inner shell 102, and may include raised portion(s) that are disposed between the antenna element 140 and the outer shell 130. In some embodiments, a portion of the plastic carrier component 136 may be externally visible. Accordingly, the plastic carrier component 136 may optionally form at least a portion of the outer surface of the housing of the ring-shaped device 100. A microphone vent seal 138 may be disposed on an outer surface of the plastic carrier component 136 and may provide sealing for the first microphone 108.

The ring-shaped device 100 may include one or more pressable or physical buttons. For example, the ring-shaped device 100 may include a button assembly 134 may be disposed along a lower portion of the housing of the ring-shaped device 100. The button assembly 134 may include one or more buttons that can be used, for example, to initiate a voice command to the ring-shaped device 100. The button assembly 134 may be coupled to the outer shell 130. Any number of buttons or manually configurable inputs may be included.

One or more audio ports and/or perforated holes for audio may be disposed on the outer shell 130 adjacent to the button assembly 134 and may allow for sound to exit the housing, but may prevent solid particle ingress. Microphone ports and/or speaker ports may be sealed using mesh and membrane to increase water resistance and/or for waterproofing.

Example embodiments of the disclosure provide a number of technical features or technical effects. For example, in accordance with example embodiments of the disclosure, certain embodiments of the disclosure may reduce power consumed by haptic feedback devices, increase mechanical strength, and/or reduce space requirements for haptic feedback devices. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
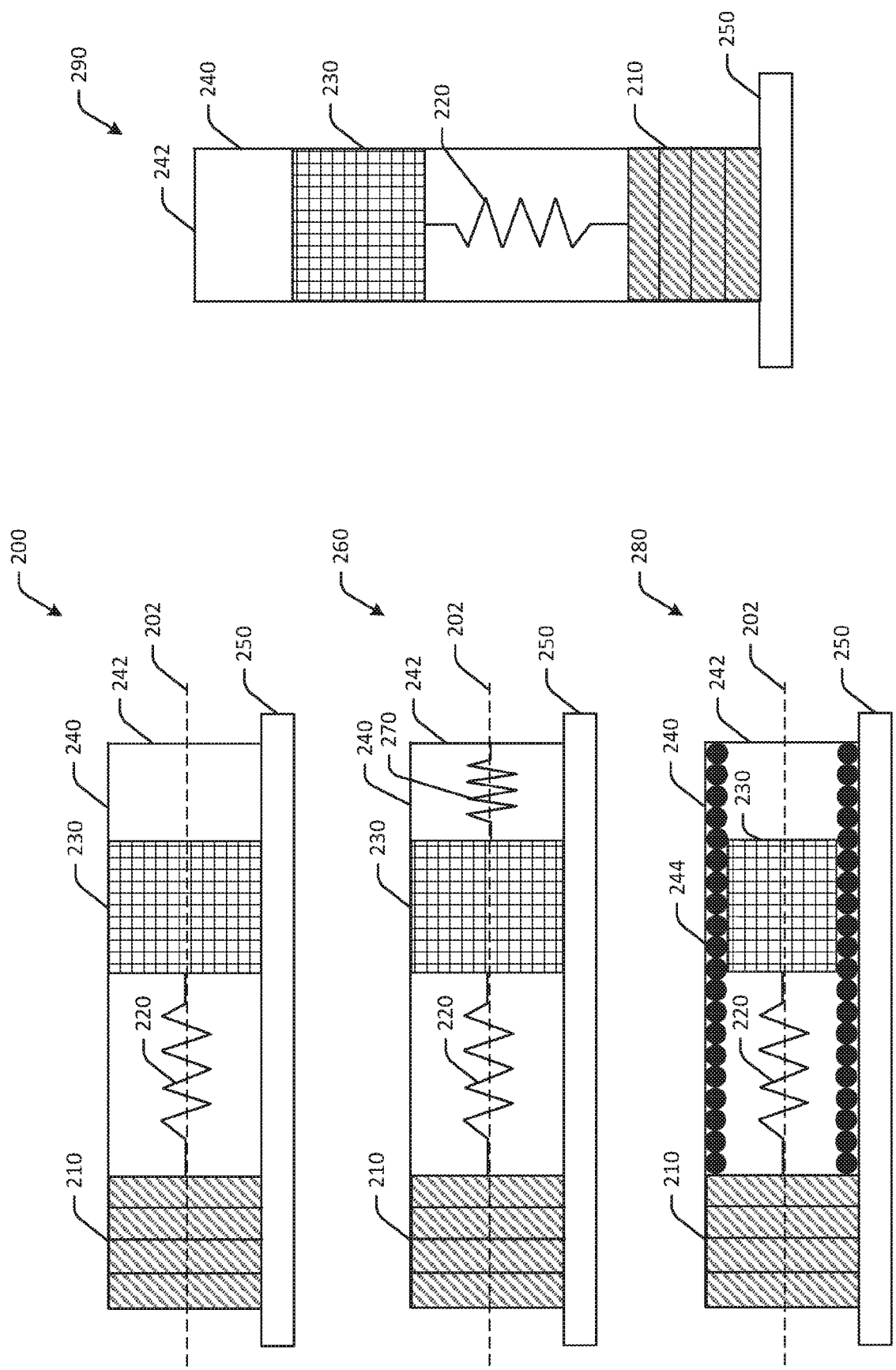
FIG. 2 is a schematic drawing of various haptic feedback devices with reduced power consumption in accordance with one or more embodiments of the disclosure.

FIG. 2 is a schematic drawing of haptic feedback devices with reduced power consumption in accordance with one or more embodiments of the disclosure. Other embodiments may include additional, fewer, and/or different components. FIG. 2 illustrates various haptic feedback devices in cross-sectional view. Some or all of the components illustrated in FIG. 2 may not be illustrated to scale. The haptic feedback devices illustrated in FIG. 2 may be the same or different than the haptic feedback device 100 discussed with respect to FIG. 1.

A first haptic feedback device 200 is illustrated in cross-sectional view. The first haptic feedback device 200 may include a resonant piezoelectric actuator 210, a spring 220, and a mass 230. The resonant piezoelectric actuator 210 may include one or more, or a plurality of, piezoelectric ceramic elements. The piezoelectric ceramic elements may be arranged in a stacked configuration. The piezoelectric elements may be arranged in order with alternating polarity. The resonant piezoelectric actuator 210 may therefore be a stacked resonant piezoelectric actuator. The resonant piezoelectric actuator 210 may be configured to generate linear movement responsive to an applied voltage. For example, the resonant piezoelectric actuator 210 may be configured to expand responsive to applied voltage. In some embodiments, the resonant piezoelectric actuator 210 may include laminar wafers of electroactive ceramic material electrically connected in parallel. The resonant piezoelectric actuator 210 may be configured to convert an electrical signal into a precisely controlled physical displacement.

A central axis 202 of the resonant piezoelectric actuator 210 is depicted. The central axis 202 may extend through a center of the resonant piezoelectric actuator 210. Central axes of either or both the spring 220 and/or the mass 230 may be aligned with the central axis 202 of the resonant piezoelectric actuator 210. The mass 230 may be configured to move along the central axis 202.

The spring 220 may have a predetermined spring constant. The spring 220 may have a first distal end and a second distal end. The spring 220 may be attached or otherwise coupled to the resonant piezoelectric actuator 210 at the first distal end. For example, the spring 220 may be coupled to the resonant piezoelectric actuator 210 with an adhesive. The spring 220 may be coupled to the mass 230 at the second distal end.

The mass 230 may be any suitable mass 230 and may have any suitable weight, such as about 20 milligrams. The mass 230 may be dimensioned so as to fit within a housing 240. In some embodiments, the mass 230 may have a width or diameter that is less than a width or diameter of the housing 240. In some embodiments, the mass may have a single degree of freedom.

The resonant piezoelectric actuator 210, spring 220, and mass 230 may be disposed in a housing 240. The housing 240 may be cylindrical, rectangular (e.g., box-like, etc.), or another suitable geometry. The housing 240 may include a sidewall 242 that forms a first end of the first haptic feedback device 200. The resonant piezoelectric actuator 210 may be disposed at a second end of the first haptic feedback device 200. In some embodiments, the housing 240 may include frictionless internal surfaces that allow the mass 230 to move within the housing 240.

The housing 240 may be disposed on a circuit board 250, such as a flexible circuit or other circuit board. In some embodiments, the housing 240 may be disposed such that the sidewall 242 is perpendicular to the circuit board 250. In such embodiments, the mass 230 may be configured to move laterally along the circuit board 250. In some embodiments, the first haptic feedback device 200 may be disposed in a ring-shaped device, such as that illustrated in FIG. 1. For example, the ring-shaped device may have a housing with an upper portion, a curved lower portion, a first curved side portion, and a second curved side portion. The ring-shaped device may include a circuit board 250 that is a flexible printed circuit disposed at least partially within the upper portion of the housing.

During operation, the resonant piezoelectric actuator 210 may impart a force on the mass 230 via the spring 220. The resonant piezoelectric actuator 210 may be configured to impart a force on the mass 230 via the spring 220 responsive to an applied voltage, which may be provided by a power source, such as a battery or any other suitable power source, that is coupled to the first haptic feedback device 200 (e.g., a battery configured to supply the applied voltage to the resonant piezoelectric actuator, etc.). The spring 220 may cause the mass 230 to return to a default position after the force is applied on the mass 230. By moving within the housing 240, the mass 230 may generate, as a result of motion, a vibration that can be used for haptic feedback.

A second haptic feedback device 260 may include the resonant piezoelectric actuator 210, the spring 220, and the mass 230. The resonant piezoelectric actuator 210, spring 220, and mass 230 may be disposed in the housing 240. The sidewall 242 of the housing 240 may be perpendicular to the circuit board 250. However, the spring 220 may be a first spring 220. The second haptic feedback device 260 may include a second spring 270. The second spring 270 may be coupled to the mass 230 and the sidewall 242. For example, the second spring 270 may be coupled to a side of the mass 230 opposite the side to which the first spring 220 is coupled. The second spring 270 may have the same spring constant and/or dimensions as the first spring 270, or may have different spring constant and/or dimensions. The second spring 270 may increase rigidity and robustness of the second haptic feedback device 260, and may therefore improve the performance of the second haptic feedback device 260 in performance tests, such as drop testing.

A third haptic feedback device 280 may include the resonant piezoelectric actuator 210, the spring 220, and the mass 230. The resonant piezoelectric actuator 210, spring 220, and mass 230 may be disposed in the housing 240. The sidewall 242 of the housing 240 may be perpendicular to the circuit board 250. However, the mass 230 may have a width or diameter (depending on the geometry of the housing 240) that is less than the housing 240 width or diameter. As a result, the housing 240 may include one or more inner surface feature(s) 244, such as ball bearings or other components that provide a smooth and/or relatively frictionless surface for the mass 230 to move within the housing 240. The inner surface feature(s) 244 may improve robustness of the third haptic feedback device 280, and may therefore improve the performance of the third haptic feedback device 280 in performance tests, such as drop testing.

A fourth haptic feedback device 290 may include the resonant piezoelectric actuator 210, the spring 220, and the mass 230. The resonant piezoelectric actuator 210, spring 220, and mass 230 may be disposed in the housing 240. However, in the fourth haptic feedback device 290, the sidewall 242 of the housing 240 may be parallel to the circuit board 250. As a result, space on the circuit board 250 consumed by the fourth haptic feedback device 290 may be reduced. The mass 230 may therefore be configured to move vertically with respect to the circuit board 250. In embodiments where space on the circuit board 250 is limited, the fourth haptic feedback device 290 may be implemented. Although the fourth haptic feedback device 290 is illustrated in an upright position, in other embodiments, the fourth haptic feedback device 290 may be in an upside-down position, where the mass 230 is still configured to move vertically with respect to the circuit board 250.

Figure 3:
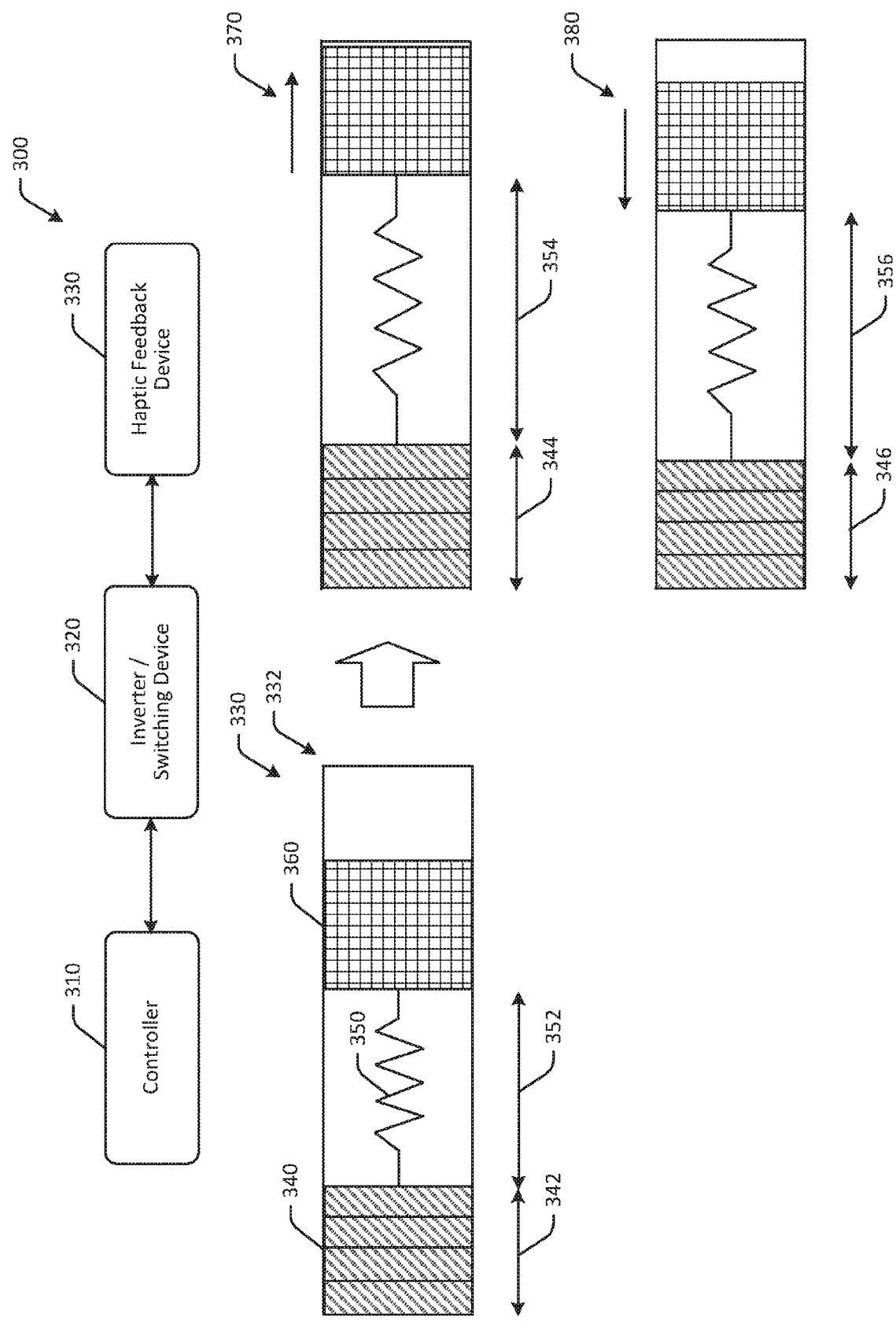
FIG. 3 is a schematic drawing of a haptic feedback device with reduced power consumption in various states in accordance with one or more embodiments of the disclosure.

FIG. 3 is a schematic drawing of a device 300 that includes a haptic feedback device 330 with reduced power consumption in various states in accordance with one or more embodiments of the disclosure. Other embodiments may include additional, fewer, and/or different components. The haptic feedback device 330 may be any of the haptic feedback devices discussed with respect to FIGS. 1-2.

The device 300 may include a controller 310, an inverter/switching device 320, and a haptic feedback device 330. In some embodiments, the controller 310 and/or the inverter/switching device 320 may be integrated with the haptic feedback device 330. The controller 310 may be any suitable component configured to control current and/or voltage provided to the haptic feedback device 330. The inverter/switching device 320 may be any suitable electrical component configured to gate voltage and/or current provided to the haptic feedback device 330. The inverter/switching device 320 may be configured to convert direct current to alternating current in some embodiments. In some embodiments, the inverter/switching device 320 may be, or may include, a switching device configured to control voltage applied to a resonant piezoelectric actuator of the haptic feedback device 330. In some embodiments, the inverter/switching device 320 may be coupled to the haptic feedback device 330, and may be configured to convert direct current to alternating current that has a sinusoidal waveform, and/or to provide the applied voltage to the haptic feedback device 330. In some embodiments, the device 300 may include a battery coupled to the inverter/switching device 320 and configured to supply voltage to the haptic feedback device 330. As illustrated in a cross-sectional view, the haptic feedback device 330 may be include a resonant piezoelectric actuator 340, one or more springs 350, and a mass 360. In a default state 332 of the haptic feedback device 330, the resonant piezoelectric actuator 340 may have a first length 342, and the spring 350 may have a second length 352.

The controller 310 may be coupled to the inverter/switching device 320 and/or the haptic feedback device 330, and may be configured to control an intermittent pulse drive for the haptic feedback device 330. For example, the controller may be configured to determine a total length of time for which vibration is to be generated by the haptic feedback device 330, and may cause the inverter/switching device 320 to be intermittently switched to (e.g., toggled between, etc.) an on position from an off position to generate the vibration, where an amount of time the switching device is in the on position is less than the total length of time.

When the inverter/switching device 320 is providing the applied voltage to the haptic feedback device 330 (e.g., the inverter/switching device 320 is in an on position, etc.), the haptic feedback device 330 may be in an active state 370. In the active state 370, the applied voltage may cause the resonant piezoelectric actuator 340 to generate linear motion. As a result, the resonant piezoelectric actuator 340 may have a third length 344 that is greater than the first length 342. The resonant piezoelectric actuator 340 may impart a force on the mass 360 via the spring 350. The spring 350 may have a fourth length 354 that is greater than the second length 352.

The mass 360 may move back and forth within a housing of the haptic feedback device 330 to generate vibration. As illustrated in an inactive state 380, when the inverter/switching device 320 ceases to provide the applied voltage to the haptic feedback device 330 (e.g., the inverter/switching device 320 is in an on position, etc.), the haptic feedback device 330 may be in the inactive state 380, and the mass 360 may gradually return to the default position, and the haptic feedback device 330 may return to the default state 332. As the mass 360 loses acceleration, the vibration generated by the motion of the mass 360 may gradually reduce.

Figure 4:
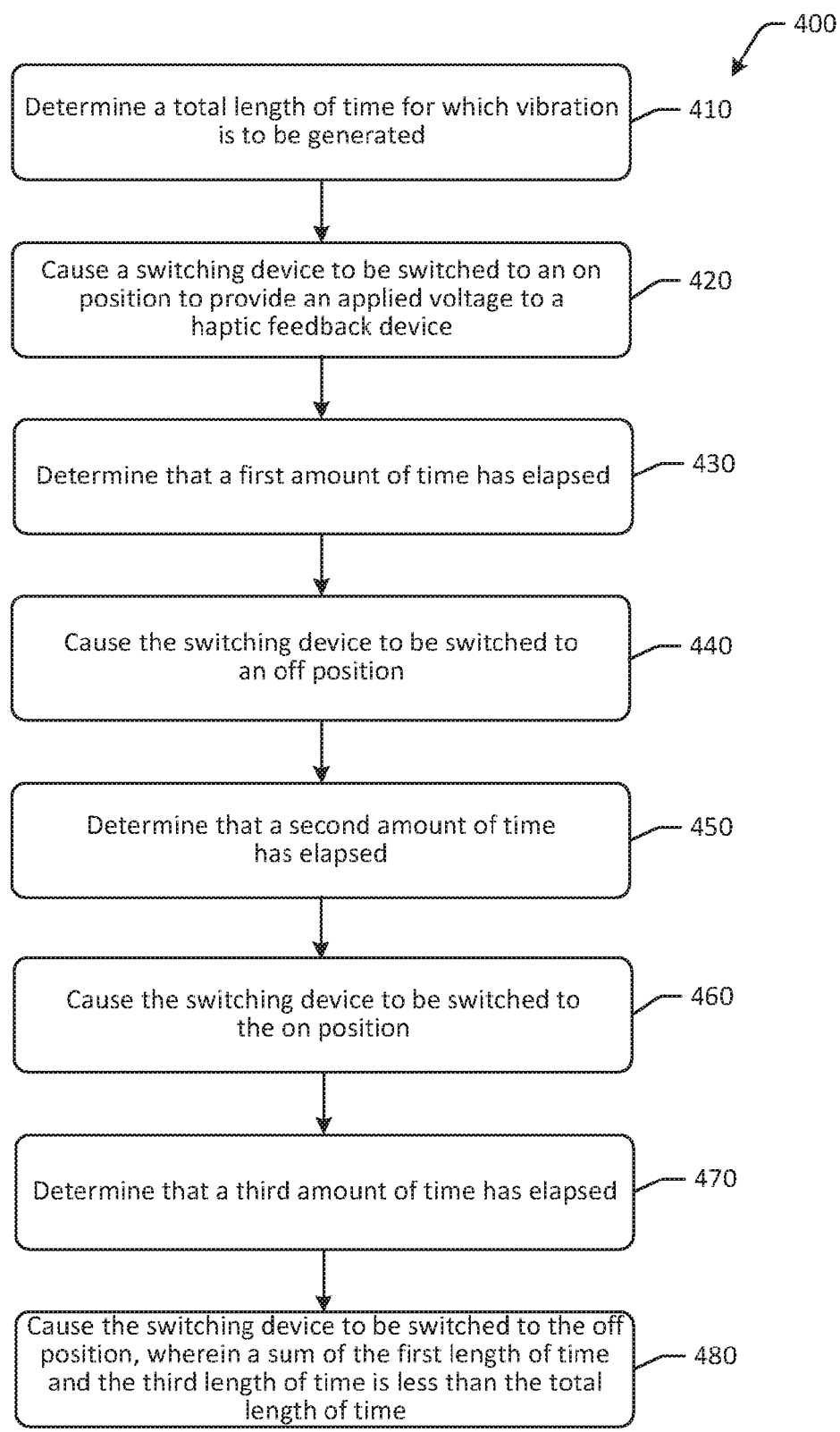
FIG. 4 is a schematic drawing of an example method for reducing power consumption for haptic feedback devices in accordance with one or more embodiments of the disclosure.

FIG. 4 is a schematic drawing of an example method 400 for reducing power consumption for haptic feedback devices in accordance with one or more embodiments of the disclosure. Other embodiments may include additional, fewer, or different operations. The operations illustrated in FIG. 4 may be performed in any suitable order, including an order different than illustrated in FIG. 4. Although discussed the context of a controller, one or more of the operations of FIG. 4 may be performed by a different component or across a distributed computing environment. The method 400 may be used to generate an intermittent pulse drive in some embodiments.

At block 410, a total length of time for which vibration is to be generated may be determined. For example, a controller of a device and/or an electrical component in communication with a haptic feedback device may determine a total length of time for which vibration is to be generated. The vibration may be generated using the haptic feedback device. The total length of time may correspond to a length of time corresponding to a notification. For example, vibration notifications corresponding to a message may have a first total length of time, whereas vibration notifications corresponding to a phone call may have a second total length of time. The vibration notifications may have a predetermined total length of time, such as vibration notifications for messages and phone calls. A number vibration notifications may not be predetermined. For example, vibration notifications for incoming phone calls may have any number of vibration notifications, where each vibration notification has a predetermined total length of time.

At block 420, the switching device may be caused to be switched to an on position. In the on position, an applied voltage may be provided to the haptic feedback device. The applied voltage may cause a resonant piezoelectric actuator to impart a force on a mass via a spring. The force on the mass may cause the mass to accelerate, and motion of the mass may cause a vibration. The vibration may be felt by a user and may provide a notification to the user. To cause the switching device to switch to the on position, a controller, inverter, or other component may cause a gate or other switching device to move from an off position to the on position.

At block 430, it may be determined that a first amount of time has elapsed. For example, the controller may determine that a first amount of time has elapsed since the switching device was moved to the on position. The first amount of time may be less than the total length of time. The first amount of time may correspond to an amount of time that the switching device is in the on position and/or an amount of time that voltage has been applied to the resonant piezoelectric actuator.

At block 440, the switching device may be caused to be switched to an off position. In the off position, alternating current or voltage provided to the haptic feedback device may be ceased. When no alternating current or voltage is provided to the haptic feedback device, the resonant piezoelectric actuator may return to a default state. The force on the mass may be removed, and the acceleration of the mass may gradually decrease. The vibration may be felt by a user with slightly less force, but a difference in vibration may not be discernible to the user in some instances. To cause the switching device to switch to the off position, a controller, inverter, or other component may cause a gate or other switching device to move from the on position to the off position.

At block 450, it may be determined that a second amount of time has elapsed. For example, the controller may determine that a second amount of time has elapsed since the switching device was moved to the off position. The second amount of time may be less than the total length of time. The second amount of time may correspond to an amount of time that the switching device is in the off position and/or an amount of time that voltage has not been applied to the resonant piezoelectric actuator.

At block 460, the switching device may be caused to be switched to the on position. The applied voltage may cause a resonant piezoelectric actuator to impart a force on a mass via a spring. The force on the mass may cause the mass to accelerate, and motion of the mass may cause a vibration. The vibration may be felt by a user and may provide a notification to the user. To cause the switching device to switch to the on position, a controller, inverter, or other component may cause a gate or other switching device to move from an off position to the on position. This may initiate a second cycle in the intermittent pulse drive.

At block 470, it may be determined that a third amount of time has elapsed. For example, the controller may determine that a third amount of time has elapsed since the switching device was moved to the on position in the second cycle. The third amount of time may be less than the total length of time. The third amount of time may correspond to an amount of time that the switching device is in the on position and/or an amount of time that voltage has been applied to the resonant piezoelectric actuator. The third amount of time may be equal to the first length of time.

At block 480, the switching device may be caused to be switched to the off position. the switching device may be caused to be switched to an off position. In the off position, alternating current or voltage provided to the haptic feedback device may be ceased. This may complete the second cycle of the intermittent pulse drive.

When no alternating current or voltage is provided to the haptic feedback device, the resonant piezoelectric actuator may return to a default state, wherein a sum of the first length of time and the third length of time is less than the total length of time. The force on the mass may be removed, and the acceleration of the mass may gradually decrease. The vibration may be felt by a user with slightly less force, but a difference in vibration may not be discernible to the user in some instances. To cause the switching device to switch to the off position, a controller, inverter, or other component may cause a gate or other switching device to move from the on position to the off position.

A sum of the first length of time and the third length of time may be less than the total length of time. A sum of the first length of time, the second length of time, and the third length of time may be equal to the total length of time. Because the switching device is not in the on position for the total length of time, power consumption due to the haptic feedback device may be reduced relative to drive schemes where the switching device is in the on position for the total length of time. In addition, a total amount of power consumed by the device may be reduced relative to devices that implement typical drive schemes to manage haptic feedback devices.

Figure 5:
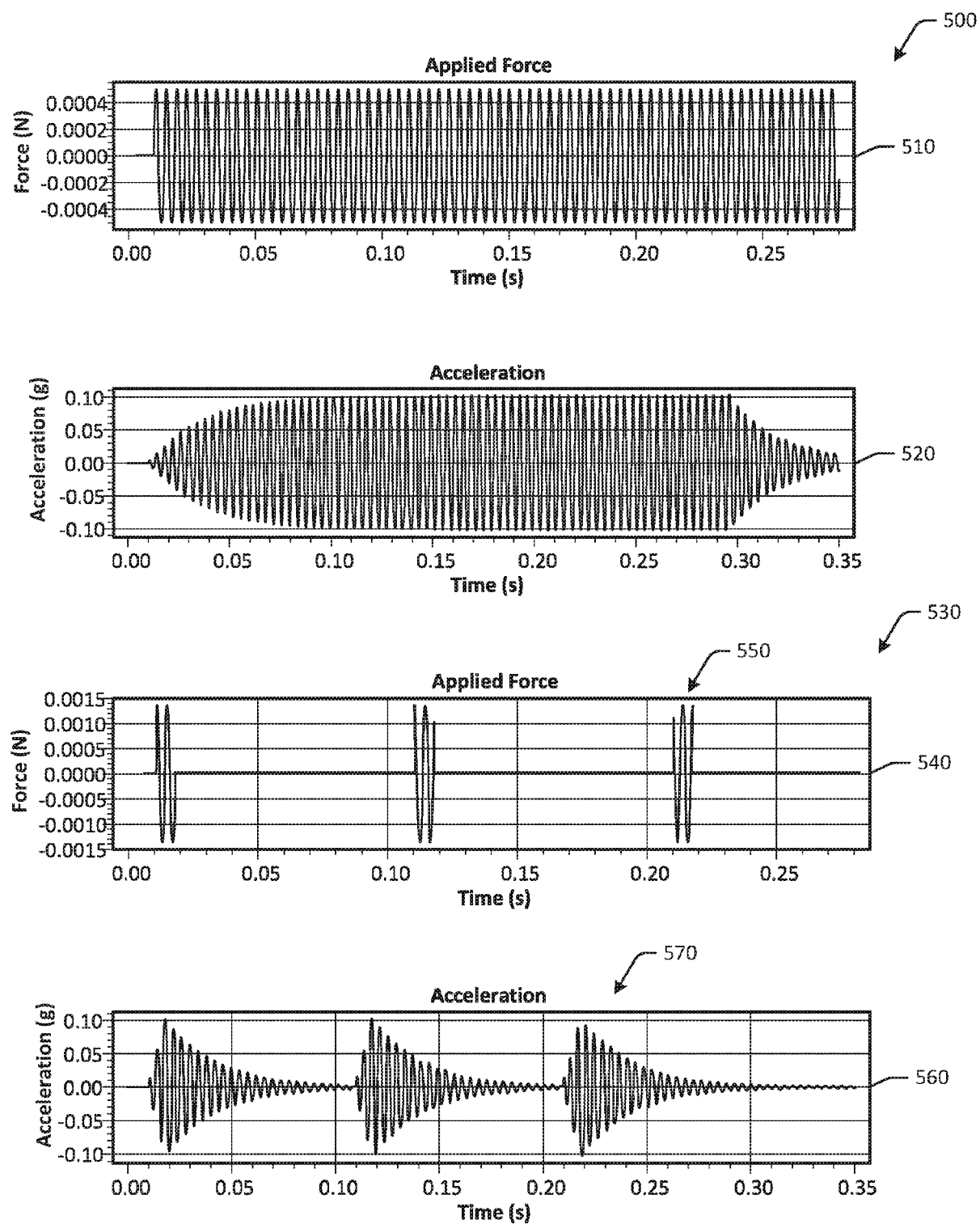
FIGS. 5-6 are schematic drawings of various applied force and acceleration graphs for different driving schemes in various views in accordance with one or more embodiments of the disclosure.
Figure 6:
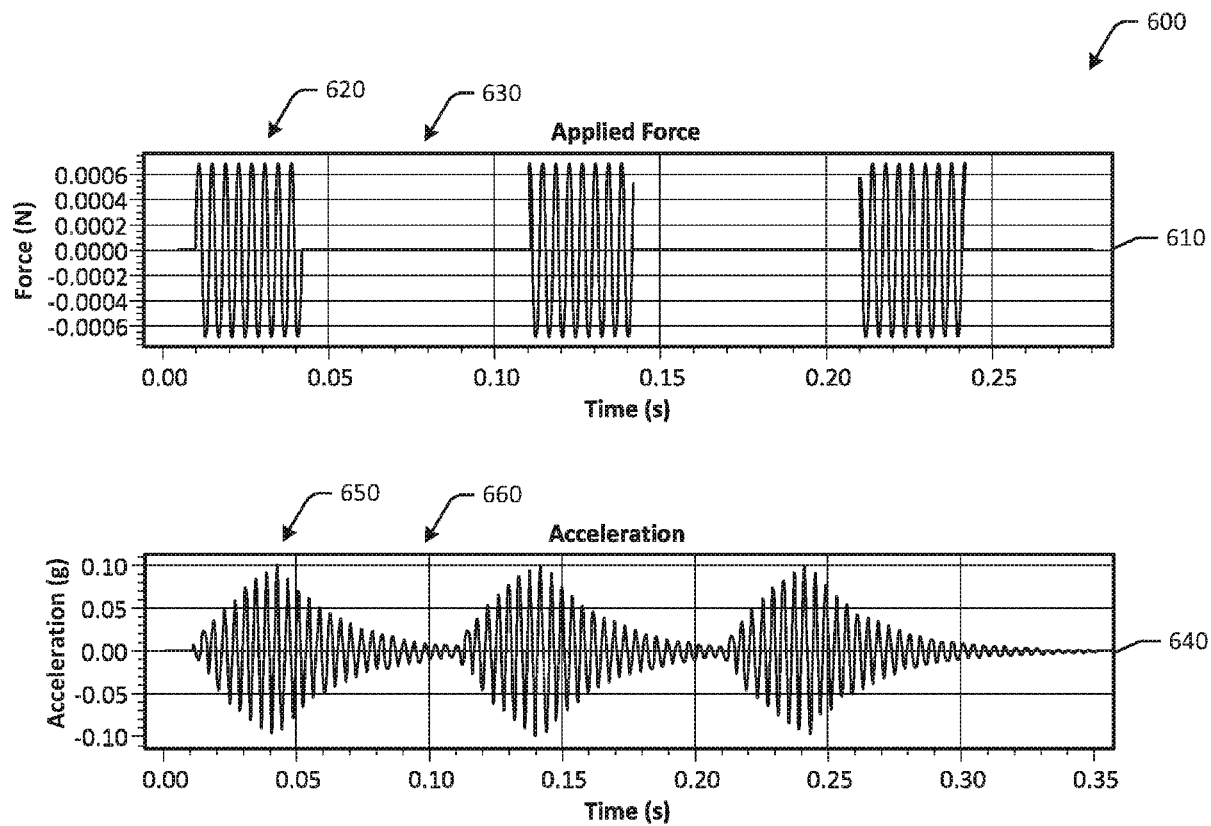

FIGS. 5-6 are schematic drawings of various applied force and acceleration graphs for different driving schemes in various views in accordance with one or more embodiments of the disclosure. Other embodiments may have different applied forces and/or acceleration values than those provided in the examples of FIGS. 5-6. In FIGS. 5-6, applied force graphs may illustrate data related to force applied by a piezoelectric actuator to a mass over time, and acceleration graphs may illustrate resultant mass acceleration over time. In the respective graphs, force may be depicted in Newton units, acceleration may be depicted in g units (where one g is the acceleration due to gravity at the Earth's surface), and time may be depicted in seconds. In some embodiments, such as those illustrated in FIG. 5, a sinusoidal driving force may be applied, where a driving frequency is equal to a resonant frequency (e.g., between about 150 Hz to about 200 Hz in one example, etc.). Driving amplitude may be adjusted to attain desired mass acceleration.

In FIG. 5, a first set of graphs 500 may include an applied force graph 510 and an acceleration graph 520. The first set of graphs 500 illustrate example applied force and acceleration data for a typical driving format where a constant pulse drive is applied to a piezoelectric actuator. The applied force graph 510 illustrates data related to force applied by a piezoelectric actuator to a mass, where a driving force is about 0.0005 Newton. The acceleration graph 520 illustrates the acceleration response of the mass to a constant pulse drive. In some instances, the acceleration graph 520 may be the result of a harmonic drive applied to the piezoelectric stack. As illustrated in the first set of graphs 510, when a constant pulse drive is used, the applied force ranges between positive and negative polarities of about 0.0005 Newton. When the force is applied, the acceleration of the mass gradually increases from 0 to about 0.10 g over a time period of about 0.07 seconds. In the first set of graphs 510, the driving pulse may be applied for the duration that acceleration is desired. For example, to attain 100 milliseconds of acceleration (and therefore haptic response), the driving pulse may be applied for 100 milliseconds. After the applied force is removed, the acceleration of the mass gradually reduces to 0 during a time period of about 0.05 seconds. The amount of power consumed to generate the acceleration in the first set of graphs 510 may be about 1.89e-4 (in arbitrary units), where a total energy is calculated, in one example, using the following equation:

$$Total\ Energy = \alpha \int |F(t)|^2 dt$$

In another example, a second set of graphs 530 may include an applied force graph 540 and an acceleration graph 560. The second set of graphs 530 illustrate example applied force and acceleration data for a short, near-impulse driving format where a near-impulse drive is applied to a piezoelectric actuator. The applied force graph 540 illustrates data related to force applied by a piezoelectric actuator to a mass, where a driving force is about 0.0015 Newton. The driving force may be applied in cycles 550, where voltage is applied in three to four cycles every about 0.10 seconds. Cycles may include changes in voltage polarity from positive to negative, for example. To control applied voltage, in one example, applied voltage may be controlled using a switching device, such as a gating mechanism. The acceleration graph 560 illustrates the acceleration response of the mass to a near-impulse drive. As illustrated in the second set of graphs 530, when a near-impulse drive is used, the applied force ranges between positive and negative polarities of about 0.0015 Newton. When the force is applied, the acceleration of the mass gradually increases from 0 to about 0.10 g over a time period of about 0.001 seconds. The acceleration peaks 570 may correspond to the driving cycles 550. After the applied force is removed, the acceleration of the mass gradually reduces to 0 during a time period of about 0.07 seconds. The amount of power consumed to generate the acceleration in the second set of graphs 530 may be about 2.03e-4 (in arbitrary units), which may be about 0.14e-4 more than a constant pulse drive, such as that illustrated in the first set of graphs 500.

In another example, embodiments of the disclosure may implement a driving scheme such as that illustrated in a third set of graphs 600 in FIG. 6. The third set of graphs 600 may include an applied force graph 610 and an acceleration graph 640. The third set of graphs 600 illustrate example applied force and acceleration data for a driving format that is intermittently applied to a piezoelectric actuator. The driving pulse may be sufficiently long to transfer sufficient energy to the spring and mass system to attain a desired acceleration. After the desired acceleration is achieved, the driving pulse may be turned off, and then turned on after a delay. A duration of the delay, or an off period, may be determined using the following formula, where $\Omega$ is a resonant frequency, and Q is a quality factor of the system:

$$\textit{Off Period} = \frac{\frac{1}{2}Q(2\pi)}{\Omega}$$

The applied force graph 610 illustrates data related to force applied by a piezoelectric actuator to a mass, where a driving force is about 0.0006 Newton. The driving force may be applied in on periods 620, where voltage is applied in about eight cycles every about 0.07 seconds. In between intermittent on periods 620, the driving force may be off during off periods 630. Cycles may include changes in voltage polarity from positive to negative, for example. To control applied voltage, in one example, applied voltage may be controlled using a switching device, such as a gating mechanism. The acceleration graph 640 illustrates the acceleration response of the mass to an intermittent pulse drive. As illustrated in the third set of graphs 600, when an intermittent pulse drive is used, the applied force ranges between positive and negative polarities of about 0.0006 Newton. When the force is applied, the acceleration of the mass gradually increases from 0 to about 0.10 g over a time period of about 0.003 seconds. The acceleration peaks 650 may correspond to a point in time shortly after the driving cycle in the on period 620 are initiated. After the applied force is removed, the acceleration of the mass gradually reduces to 0 during a time period of about 0.06 seconds.

As illustrated in FIG. 6, the on periods 620 may include eight cycles of the applied voltage. Although discussed in terms of eight cycles, any suitable number of cycles, such as at least two cycles, may be used and may be determined based at least in part on frequency, desired duration, and/or device configuration. In some embodiments, the eight cycles may be completed during a period in which the switching device is in the on position. A duration of the on period 630 may be about 40 milliseconds. A duration of the off period 630 in which the switching device is in the off position may be about 50 milliseconds. An acceleration of the mass during the total length of time the mass is accelerating (e.g., from about 0.02 seconds to about 0.35 seconds in FIG. 6, etc.), may be non-uniform for the duration of the total length of time. For example, the acceleration may be cyclical, but may be continuously changing. In some embodiments, at least two on periods 620 may be included. Any suitable number of on periods may be used.

The amount of power consumed to generate the acceleration in the third set of graphs 600 may be about 1.50e-4 (in arbitrary units), which may be about 0.53e-4 (in arbitrary units) less than the amount of power consumed with a near-impulse drive format, such as that illustrated in the second set of graphs 530, and about 0.39e-4 (in arbitrary units) less than the amount of power consumed with a constant drive format, such as that illustrated in the first set of graphs 500. Accordingly, the driving scheme illustrated in FIG. 6 may consume about 21% less power than the constant drive format, and about 26% less power than the near-impulse drive format. As a result, battery life may be increased due to reduced power consumption by haptic feedback devices.

In addition, as illustrated by the respective acceleration graphs, an amount of vibration felt by a user that is in contact with the device may not be materially affected by using the intermittent pulse drive illustrated in FIG. 6. The user experience may be maintained as acceleration remains relatively consistent, and the human body may be unable to detect the minor changes in acceleration over time illustrated in FIG. 6.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
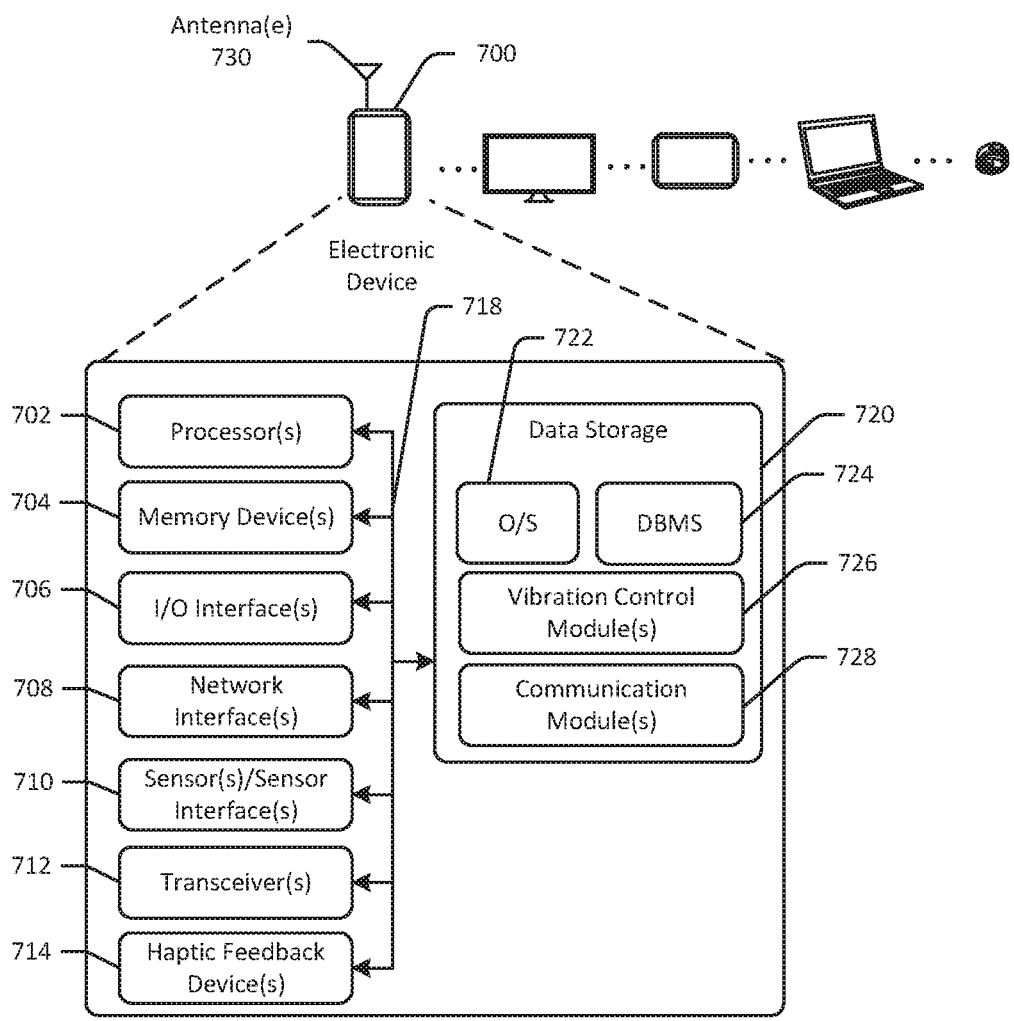
FIG. 7 schematically illustrates an example architecture of a device with a haptic feedback device in accordance with one or more embodiments of the disclosure.

FIG. 7 is a schematic block diagram of one or more illustrative electronic device(s) 700 in accordance with one or more example embodiments of the disclosure. The electronic device(s) 700 may include any suitable computing device with or without a display, in some instances, including, but not limited to, a server system, a mobile device, a wearable device, or the like; a content streaming device; a scanning device; a speaker device; or the like. The electronic device(s) 700 may correspond to an illustrative device configuration for the devices of FIGS. 1-6.

The electronic device(s) 700 may be configured to communicate with one or more servers, user devices, or the like. The electronic device(s) 700 may be configured to determine voice commands, determine wakeword utterances, determine and/or control other devices, and other operations. The electronic device(s) 700 may be configured to emit light, detect sound, output audio content, and other functionality.

The electronic device(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., linklayer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional speakers and/or microphones, one or more haptic feedback device(s) 714, and data storage 720. The electronic device(s) 700 may further include one or more bus(es) 718 that functionally couple various components of the electronic device(s) 700. The electronic device(s) 700 may further include one or more antenna(e) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the electronic device(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the electronic device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more vibration control module(s) 726 and/or one or more communication module(s) 728. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the electronic device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, speaker identification or user profile information, and/or other information.

The processor(s) 702 may be configured to access the memory 704 and execute the computer-executable instructions loaded therein. For example, the processor(s) 702 may be configured to execute the computer-executable instructions of the various program module(s), applications, engines, or the like of the electronic device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the vibration control module(s) 726 may include computer-executable instructions, code, or the like that responsive to execution by one or more of the processor(s) 702 may perform functions including, but not limited to, determining a length of vibration to generate, determining on and/or off time intervals or durations for haptic feedback devices, and the like.

The communication module(s) 728 may include computer-executable instructions, code, or the like that responsive to execution by one or more of the processor(s) 702 may perform functions including, but not limited to, sending and/or receiving data, including content, sending and/or receiving instructions and commands, and the like.

Referring now to other illustrative components depicted as being stored in the data storage 720, the O/S 722 may be loaded from the data storage 720 into the memory 704 and may provide an interface between other application software executing on the electronic device(s) 700 and the hardware resources of the electronic device(s) 700. More specifically, the O/S 722 may include a set of computer-executable instructions for managing the hardware resources of the electronic device(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 700 is a mobile device, the DBMS 724 may be any suitable lightweight DBMS optimized for performance on a mobile device.

Referring now to other illustrative components of the electronic device(s) 700, the input/output (I/O) interface(s) 706 may facilitate the receipt of input information by the electronic device(s) 700 from one or more I/O devices as well as the output of information from the electronic device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 700 may further include one or more network interface(s) 708 via which the electronic device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 730 may include any suitable type of antenna depending, for example, on the communications protocols used to transmit or receive signals via the antenna(e) 730. Non-limiting examples of suitable antennae may include directional antennae, non-directional antennae, dipole antennae, folded dipole antennae, patch antennae, multiple-input multiple-output (MIMO) antennae, or the like. The antenna(e) 730 may be communicatively coupled to one or more transceivers 712 or radio components to which or from which signals may be transmitted or received.

As previously described, the antenna(e) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 730 may be configured to transmit or receive radio frequency signals within any suitable frequency range forming part of the unlicensed portion of the radio spectrum.

The antenna(e) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for – in cooperation with the antenna(e) 730 - transmitting or receiving radio frequency (RF) signals in the bandwidth and/or channels corresponding to the communications protocols utilized by the electronic device(s) 700 to communicate with other devices. The transceiver(s) 712 may include hardware, software, and/or firmware for modulating, transmitting, or receiving –potentially in cooperation with any of antenna(e) 730 - communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the electronic device(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The haptic feedback device(s) 714 may be any of the haptic feedback devices described herein, such as those described with respect to FIGS. 1-6. The device may include optional speaker(s) and/or microphone(s), which may include any device configured to output audio and/or any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device(s) 700 may include alternate and/or additional hardware, software, or firmware components beyond those described or depicted without departing from the scope of the disclosure. More particularly, it should be appreciated that software, firmware, or hardware components depicted as forming part of the electronic device(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s)

may be depicted and described as submodule(s) of another module, in certain embodiments, such module(s) may be provided as independent module(s) or as sub-module(s) of other module(s).

One or more operations of the methods, process flows, and/or use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A ring-shaped device comprising:
a housing comprising an upper portion, a curved lower portion, a first curved side portion, and a second curved side portion;
a flexible printed circuit disposed at least partially within the upper portion of the housing;
a haptic feedback device disposed on the flexible printed circuit, the haptic feedback device comprising:
   a stacked resonant piezoelectric actuator comprising a plurality of piezoelectric ceramic elements arranged in a stacked configuration, the stacked resonant piezoelectric actuator configured to generate linear movement responsive to an applied voltage;
   a first spring comprising a first distal end and a second distal end, the first spring coupled to the stacked resonant piezoelectric actuator at the first distal end; and
   a mass coupled to the first spring at the second distal end of the first spring;
an inverter comprising a switching device, the inverter disposed on the flexible printed circuit and coupled to the haptic feedback device, wherein the inverter is configured to convert direct current to alternating current that has a sinusoidal waveform, and to provide the applied voltage to the haptic feedback device; and
a battery coupled to the inverter and configured to supply the applied voltage to the stacked resonant piezoelectric actuator.

2. The ring-shaped device of claim 1, further comprising:
a controller disposed on the flexible printed circuit, the controller configured to:
   determine a total length of time for which vibration is to be generated using the haptic feedback device;
   cause the switching device to be switched to an on position to provide the applied voltage to the haptic feedback device, wherein the applied voltage causes the stacked resonant piezoelectric actuator to impart a force on the mass via the first spring, and wherein motion of the mass causes the vibration;
   determine that a first amount of time has elapsed;
   cause the switching device to be switched to an off position to cease providing alternating current to the haptic feedback device;
   determine that a second amount of time has elapsed;
   cause the switching device to be switched to the on position;
   determine that a third amount of time has elapsed; and
   cause the switching device to be switched to the off position, wherein a sum of the first length of time and the third length of time is less than the total length of time.

3. The ring-shaped device of claim 1, wherein the haptic feedback device further comprises a cylindrical housing, and a sidewall that is perpendicular to the flexible printed circuit, and wherein a central axis of the stacked resonant piezoelectric actuator is aligned with the first spring and the mass, such that the mass is configured to move along the central axis.

4. The ring-shaped device of claim 1, wherein the haptic feedback device further comprises a second spring, a cylindrical housing, and a sidewall, and wherein:
the stacked resonant piezoelectric actuator is disposed at a first end of the cylindrical housing;
the sidewall is disposed at a second end of the cylindrical housing; and
the second spring is coupled to both the sidewall and the mass.

5. A device comprising:
a first spring;
a mass coupled to the first spring;
a resonant piezoelectric actuator coupled to the first spring, the resonant piezoelectric actuator configured to impart a force on the mass via the first spring responsive to an applied voltage;
a switching device configured to control the applied voltage; and
a power source configured to supply the applied voltage to the resonant piezoelectric actuator;
wherein the force on the mass causes a motion of the mass, and wherein the motion generates vibration, and wherein an acceleration of the mass as a result of the force imparted on the mass by the resonant piezoelectric actuator during the total length of time is non-uniform.

6. The device of claim 5, further comprising:
a haptic feedback device housing comprising a sidewall at a first end, wherein the resonant piezoelectric actuator is disposed at a second end of the haptic feedback device.

7. The device of claim 6, further comprising a second spring, wherein the second spring is coupled to the sidewall and the mass.

8. The device of claim 6, further comprising:
a circuit board, wherein the haptic feedback device housing is disposed on the circuit board.

9. The device of claim 8, wherein the sidewall is perpendicular to the circuit board.

10. The device of claim 5, wherein the mass has a single degree of freedom.

11. The device of claim 5, further comprising:
a controller coupled to the switching device, the controller configured to:
   determine a total length of time for which vibration is to be generated; and
   cause the switching device to be intermittently toggled between an on position from an off position to generate the vibration, wherein an amount of time the switching device is in the on position is less than the total length of time.

12. The device of claim 11, wherein eight cycles of the applied voltage are completed during a period in which the switching device is in the on position, and wherein a duration of the period is about 40 milliseconds.

13. The device of claim 11, wherein a duration of a period in which the switching device is in the off position is about 50 milliseconds.

14. A device comprising:
a haptic feedback device comprising:
   a spring;
   a mass coupled to the spring; and
   a resonant piezoelectric actuator coupled to the spring, the resonant piezoelectric actuator configured to impart a force on the mass via the spring responsive to an applied voltage; and
a battery configured to supply the applied, wherein motion of the mass generates vibration;
a switching device; and
a controller coupled to the switching device, the controller configured to:
   determine a total length of time for which vibration is to be generated; and cause the switching device to be intermittently toggled between an on position from an off position to generate the vibration, wherein an amount of time the switching device is in the on position is less than the total length of time.

15. The device of claim 14, wherein an acceleration of the mass during the total length of time is non-uniform.

16. The device of claim 14, wherein the haptic feedback device further comprises:
   a housing comprising a sidewall at a first end, wherein the resonant piezoelectric actuator is disposed at a second end of the haptic feedback device.

17. The device of claim 16, wherein the mass is configured to move vertically relative to the sidewall.

* * * * *